US012163265B2

(12) United States Patent
Kvarnstrand

(10) Patent No.: US 12,163,265 B2
(45) Date of Patent: Dec. 10, 2024

(54) INTERACTIVE AUGMENTED REALITY SEWING MACHINES

(71) Applicant: Singer Sourcing Limited LLC, Nashville, TN (US)

(72) Inventor: Laura Kvarnstrand, Habo (SE)

(73) Assignee: Singer Sourcing Limited LLC, La Vergne, TN (US)

( * ) Notice: Subject to any disclaimer, the term of this patent is extended or adjusted under 35 U.S.C. 154(b) by 58 days.

(21) Appl. No.: 17/720,594

(22) Filed: Apr. 14, 2022

(65) Prior Publication Data
US 2022/0335856 A1 Oct. 20, 2022

Related U.S. Application Data

(60) Provisional application No. 63/175,194, filed on Apr. 15, 2021.

(51) Int. Cl.
*D05B 19/08* (2006.01)
*D05B 69/30* (2006.01)
(Continued)

(52) U.S. Cl.
CPC ........... *D05B 19/08* (2013.01); *D05B 19/085* (2013.01); *D05B 69/30* (2013.01); *G06F 3/016* (2013.01);
(Continued)

(58) Field of Classification Search
CPC ...... D05B 19/06; D05B 19/00; D05B 19/006; D05B 19/02; D05B 19/04; D05B 19/08;
(Continued)

(56) References Cited

U.S. PATENT DOCUMENTS

| 4,821,657 A * | 4/1989 | Herdeg | D05B 19/08 362/90 |
| 5,042,410 A * | 8/1991 | Nakashima | D05B 19/02 112/306 |

(Continued)

FOREIGN PATENT DOCUMENTS

| CN | 207845955 U | 9/2018 |
| DE | 202018103728 U1 | 10/2019 |

(Continued)

OTHER PUBLICATIONS

International Search Report and Written Opinion from PCT/US2022/024768 dated Jul. 28, 2022 (20 pages).

(Continued)

*Primary Examiner* — Danny Worrell
(74) *Attorney, Agent, or Firm* — Calfee, Halter & Griswold LLP

(57) ABSTRACT

Systems and methods for interactive guidance of sewing activities are described herein. Many sewing activities such as threading media, conducting general machine maintenance, and sewing using a pattern can be difficult and may require multiple steps to be performed correctly. Through the use of augmented reality (AR), the technologies disclosed herein provide interactive guidance to a user in order to perform one or more sewing activities. The performance of these activities is further enhanced using sensor feedback which can reduce common errors associated with each activity.

20 Claims, 8 Drawing Sheets

(51) Int. Cl.
*G06F 3/01* (2006.01)
*G06T 11/00* (2006.01)
*G06V 20/20* (2022.01)
*G09B 5/02* (2006.01)
*H04N 9/31* (2006.01)

(52) U.S. Cl.
CPC .............. *G06T 11/00* (2013.01); *G06V 20/20* (2022.01); *G09B 5/02* (2013.01); *H04N 9/31* (2013.01)

(58) Field of Classification Search
CPC ...... D05B 19/085; D05B 19/10; G06V 20/20; G05B 2219/2626
See application file for complete search history.

(56) References Cited

U.S. PATENT DOCUMENTS

| | | | |
|---|---|---|---|
| 5,205,232 A * | 4/1993 | Sadeh | G05B 19/4083 |
| | | | 112/475.03 |
| 5,537,945 A | 7/1996 | Sugihara et al. | |
| 6,100,989 A | 8/2000 | Leuenberger | |
| 6,715,435 B1 * | 4/2004 | Wieczorek | D05B 79/00 |
| | | | 112/272 |
| 8,463,420 B2 * | 6/2013 | Tokura | D05C 13/02 |
| | | | 700/137 |
| 8,607,721 B2 * | 12/2013 | Koga | D05B 19/12 |
| | | | 112/475.05 |
| 10,519,581 B2 | 12/2019 | Kamihira et al. | |
| 10,889,925 B2 * | 1/2021 | Blenis, Jr. | D05B 19/14 |
| 11,441,253 B2 * | 9/2022 | Jaeger | D05B 19/16 |
| 11,555,265 B2 * | 1/2023 | Blenis, Jr. | A41H 43/04 |
| 2006/0206232 A1 | 9/2006 | Palmer et al. | |
| 2011/0146553 A1 * | 6/2011 | Wilhelmsson | D05C 9/06 |
| | | | 112/102.5 |
| 2013/0321579 A1 | 12/2013 | Firkus | |
| 2014/0318430 A1 | 10/2014 | Kato et al. | |
| 2015/0252503 A1 * | 9/2015 | Tokura | D05B 19/08 |
| | | | 112/470.01 |
| 2017/0316590 A1 | 11/2017 | Kongo | |
| 2018/0258569 A1 | 9/2018 | Kamihira et al. | |
| 2018/0355530 A1 * | 12/2018 | Blenis, Jr. | D05B 19/105 |
| 2019/0376216 A1 | 12/2019 | Blenis, Jr. | |
| 2019/0378266 A1 | 12/2019 | Takahashi | |
| 2020/0008782 A1 | 3/2020 | Kamihira et al. | |
| 2020/0248348 A1 | 8/2020 | Konzak | |
| 2022/0042226 A1 | 2/2022 | Kvarnstrand et al. | |
| 2022/0335856 A1 * | 10/2022 | Kvarnstrand | G06F 3/011 |

FOREIGN PATENT DOCUMENTS

| | | |
|---|---|---|
| EP | 1589869 A1 | 11/2005 |
| EP | 2924158 A1 | 9/2015 |
| JP | 2019201741 A | 11/2019 |
| WO | 2004069050 A | 8/2004 |
| WO | 2017090295 A1 | 1/2017 |
| WO | 2023086462 A1 | 5/2023 |

OTHER PUBLICATIONS

Rambach Jason et al: "[Poster] Augmented Things: Enhancing AR Applications leveraging the Internet of Things and Universal 3D Object Tracking", 2017 IEEE International Symposium on Mixed and Augmented Reality (ISMAR-Adjunct), IEEE, Oct. 9, 2017 (Oct. 9, 2017), pp. 103-108, XP033242537.
Källström et al. Thesis—Prototype of an augmented reality user manual app for an advanced tool, May 22, 2014 (71 pages).
International Search Report and Written Opinion from PCT Application No. PCT/US2021/038151 dated Oct. 12, 2021, 34 pages.
International Preliminary Report on Palatability from PCT/US2022/024768 dated Oct. 26, 2023 (11 pages).
Search Report from PCT Application No. PCT/US2021/038151 dated Oct. 12, 2021 (7 pages).
International Search Report and Written Opinion from PCT/US2022/049533 dated Mar. 17, 2023.

* cited by examiner

INTERACTIVE AUGMENTED REALITY SEWING MACHINES

CROSS-REFERENCE TO RELATED APPLICATION(S)

This application claims priority to and any benefit of U.S. Provisional Application No. 63/175,194, filed Apr. 15, 2021, the content of which is incorporated herein by reference in its entirety.

TECHNICAL FIELD

The present disclosure generally relates to sewing machines configured to be used with interactive Augmented Reality (AR) features.

BACKGROUND

Sewing machines can be used to form stitches in a single piece of material and to stitch together various pieces of material. Particular sewing machines can be used to form stitches in workpieces having a certain shape, cut and stitch over the edge of a workpiece, attach decorative elements to a workpiece, and cut and hem an edge of a workpiece, attach a decoration or sew an embroidery pattern on a workpiece that is mounted in an embroidery frame or to cut the workpiece during the sewing operation. A sewing machine can also cut, fold, roll, or otherwise manipulate the workpiece in addition to or separate from the sewing procedure. The workpiece is moved underneath the needle so that stitches can be formed in the fabric. A user configures the workpiece and sewing machine for each particular application by adjusting various parameters of the machine and by attaching a variety of different tools or accessories to the machine. The procedures required for a user to configure the workpiece and sewing machine are often complicated, and, if done incorrectly, can damage the workpiece and/or the sewing machine. Relying on manuals or similar printed instructions can be burdensome for users and still result in incorrect configuration.

It is therefore appreciated that improved guidance for workpiece and sewing machine configuration is needed.

BRIEF SUMMARY

In an exemplary embodiment, a method for interactive sewing machine guidance is provided. The method comprises receiving image data from a camera, wherein the image data comprises a reference image of at least a portion of a sewing machine; displaying the reference image at a user device, wherein the user device comprises a display; overlaying a guidance image over the reference image, wherein the guidance image illustrates at least one step of an activity associated with the sewing machine; responsive to an indication that the activity has been started, receiving sensor feedback from at least one sensor at the sewing machine, wherein the sensor feedback is generated based on performance of the activity; and responsive to the sensor feedback, modifying the guidance image.

In another exemplary embodiment, a method for interactive sewing machine guidance is provided. The method comprises, responsive to an activity request, initiating an activity at a sewing machine, wherein the activity comprises manipulating a workpiece with the sewing machine; receiving image data from a camera, wherein the image data comprises a reference image of the workpiece; projecting a guidance image onto the workpiece, wherein the guidance image is based on the reference image; receiving sensor feedback from at least one sensor at the sewing machine, wherein the sensor feedback is generated based a comparison of the guidance image and the reference image; and determining a completeness of the activity based on the sensor feedback.

In another exemplary embodiment, a method for interactive sewing machine guidance is provided. The method comprises, responsive to an activity request, initiating an activity at a sewing machine, wherein the activity comprises manipulating a workpiece with the sewing machine; receiving image data from a camera, wherein the image data comprises a reference image of at least a portion of the sewing machine; displaying a reference image at a user device, wherein the user device comprises a display; overlaying a first guidance image over the reference image, wherein the guidance image illustrates at least one step of an activity associated with the sewing machine; responsive to an indication that the activity has been started, receiving sensor feedback from at least one sensor at the sewing machine, wherein the sensor feedback is generated based on performance of the activity, wherein the sensor feedback is operable to generate physical feedback; and responsive to the sensor feedback, modifying the guidance image at the user device.

In yet another exemplary embodiment, a system for interactive sewing machine guidance is provided. The system comprises a sewing machine and a user device, wherein the user device is configured to receive image data from a camera, wherein the image data comprises a reference image of at least a portion of the sewing machine; display the image data at the user device, wherein the user device comprises a display; overlay a guidance image over the reference image of the sewing machine, wherein the guidance image illustrates at least one step of an activity; responsive to beginning the activity at the sewing machine, receive sensor feedback from at least one sensor at the sewing machine, wherein the sensor feedback is generated based on performance of the activity; and responsive to the sensor feedback, modify the guidance image.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
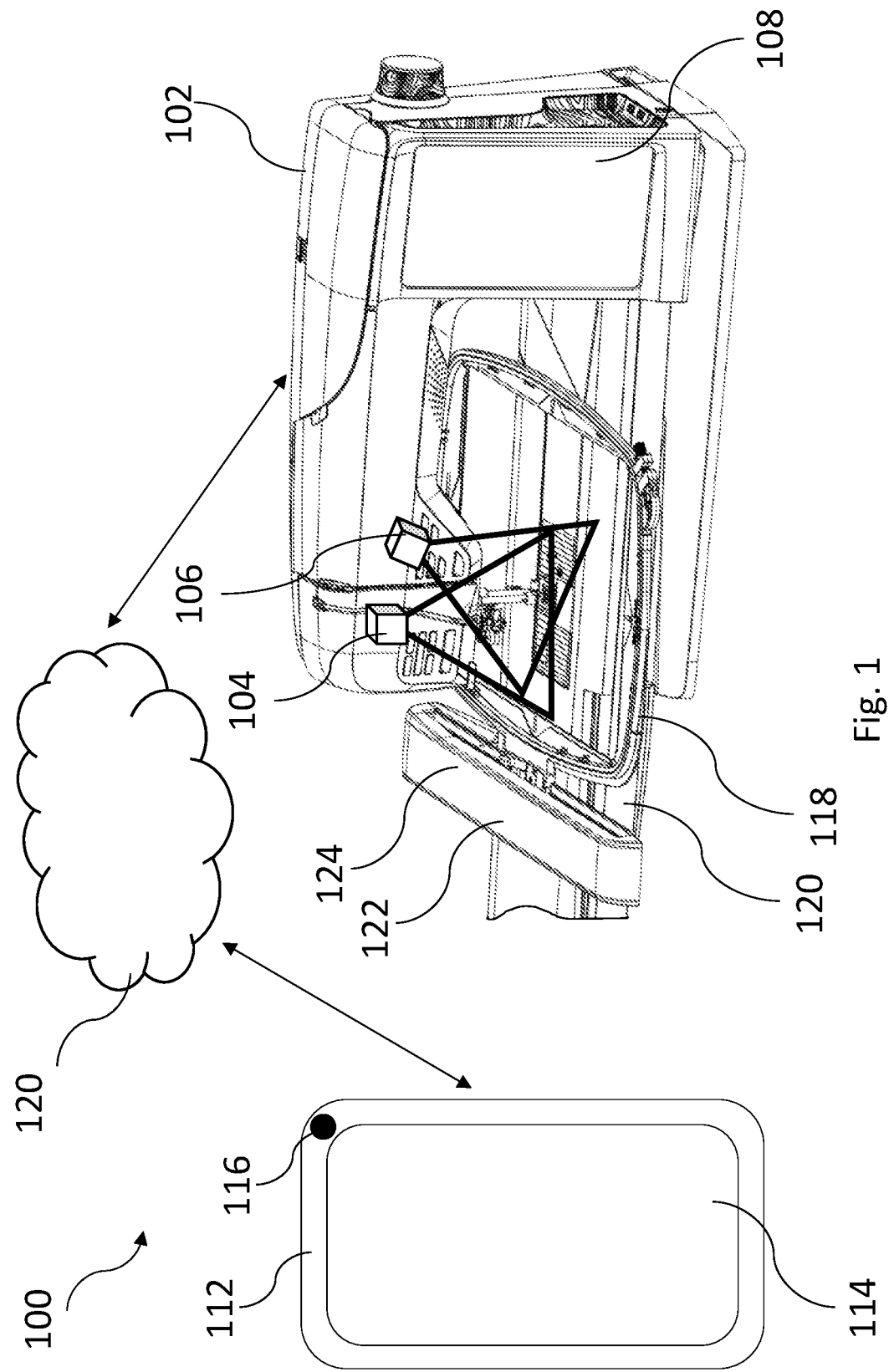
FIG. 1 shows an exemplary system for interactive sewing machine guidance.

FIG. 1 shows an exemplary system 100 for interactive sewing machine guidance according to the various embodiments of the present disclosure. System 100 may comprise at least a sewing machine 102 and user device 112. The sewing machine 102 and user device 112 can be in data communication, for example, over network 120 (e.g., the Internet). In certain embodiments, sewing machine 102 and user device 112 may be in data communication using one or more data communication protocols (e.g., Bluetooth, RFID, Near-Field Communication, etc.). It is appreciated that the data communication between the sewing machine 102 and user device 112 may be in real-time or near real-time. It is further appreciated that such data communication allows for the sewing machine 102 and user device 112 to read and/or write data to local and/or remote memory. In certain embodiments, the sewing machine and user device 112 are configured to transmit data over network 120 to be stored at one or more remote servers (e.g., the cloud).

Exemplary sewing machines (e.g., sewing machine 102) may include a sewing bed or base having a pillar extending upward from one end to support an arm that extends horizontally above the sewing bed. A sewing head is attached to the end of the arm and can include one or more needle bars for moving needles up and down for sewing a workpiece on the sewing bed below the sewing head. The sewing bed includes a needle or stitch plate arranged below the sewing head that has openings for the needle or needles to pass through when making or forming stitches in the workpiece. In some sewing machines, a bobbin arranged beneath the needle plate assists in stitch formation and dispenses a lower thread that is stitched together with an upper thread delivered through the workpiece from above by the needle. In other sewing machines, such as, for example, an overlock or serger machine, lower threads are dispensed by loopers.

As used herein, "sewing machine" means a device that forms one or more stitches in a workpiece with a reciprocating needle and a length of thread. "Sewing machine" as used herein includes, but is not limited to, sewing machines for forming particular stitches (e.g., a sewing machine configured to form a lock-stitch, a chain stitch, a buttonhole stitch), embroidery machines, quilting machines, overlock or serger machines, or the like. It should be noted that various embodiments of sewing machines and accessories are disclosed herein, and any combination of these options can be made unless specifically excluded. In other words, individual components or portions of the disclosed devices can be combined unless mutually exclusive or otherwise physically impossible.

A "stitch" means a loop formed with one or more threads, wherein at least one of thread passes through a hole formed in a workpiece. The mechanical components of the sewing machine, for example, needles, hooks, loopers, thread tensioning devices, feed mechanisms, and the like, cooperate to form stitches in one or more pieces of a workpiece. One repetition of this complex mechanical dance can form one stitch or a pattern of stitches in the workpiece. A "stitch length" of the repetition or pattern refers to a distance that the workpiece is moved as the repetition is performed. The stitch length measurement is different for different types of repetitions and patterns and can encompass one or more stitches in the workpiece.

A presser bar with a presser foot also extends downward from the sewing head to press the workpiece against the sewing bed and against feed dogs that move from back-to-front and optionally side-to-side to move the workpiece. The feed dogs move the workpiece in coordination with the presser foot and with a speed that can be fixed or can be variably controlled by the user, such as with a foot pedal. A wide variety of presser feet and other types of accessories can be attached to the presser bar to assist in the formation of certain kinds of stitches or features in the workpiece, such as, for example, a button hole presser foot. An accessory mount can also extend below the sewing head for holding a special tool or accessory on or above the sewing bed. For example, as illustrated in FIG. 1, sewing machine 102 comprises an optional embroidery hoop 118 operable to enable manipulation of a workpiece affixed to the embroidery hoop 118 using X unit 120 and Y unit 122. The Y unit 122 also comprises a Y slide 124.

The speed or frequency with which the needle bar is moved up and down is controlled by the user as noted above. While the needle bar typically moves up and down in a cyclical motion to form a stitch in the workpiece, the needle bar can also be moved from side-to-side to form a different stitch, such as a zig-zag stitch or a tapered stitch, or to alter the width of a stitch. The type and pitch of the stitch performed by the machine can be selected by the user via a manual interface including buttons, knobs, levers, or the like. In some embodiments, the type and pitch of the stich performed (or similar settings) may be controllable by a user via input into a user interface, such as, for example, the user interface provided at display 114 of user device 112 and/or the display 108. In other embodiments settings may be controllable via voice command input into a voice control interface.

Different types of sewing machines can include additional components for forming stitches in or otherwise manipulating the workpiece during the sewing process. For example, in a serger, a type of sewing machine that can be used for forming edges of a workpiece, among other functions, needles called loopers operate below the sewing bed to deliver lower threads for forming various stitches. A serger can also include one, two, or more needles above the needle plate and a knife for cutting the edge of the workpiece. A sewing machine can also be used to create embroidery patterns in a workpiece by including a holder for an embroidery hoop on the sewing bed (e.g. embroidery hoop 118). The embroidery hoop holder can be actuated in at least two axes so that a controller of the sewing machine can cause the embroidery frame to be moved so that the needle traces out an embroidery pattern on the workpiece. Sergers typically have multiple, complicated threading paths. The availability of written or oral instructions are often considered insufficient. Hence, threading a serger is commonly regarded as difficult task by users and instead of performing the task themselves, many users pay a technician to thread their machines which is a timely and costly effort.

Thread used during sewing is held in various locations on the sewing machine, such as, for example, inside the bobbin or on a spool held by a spool holder that is part of or extends above the arm of the sewing machine. Thread is led from the thread source (e.g., a bobbin or spool) and to the needle or needles of the sewing machine through various other elements of the sewing machine arranged to change the direction of the thread so that the thread is smoothly withdrawn and delivered to the workpiece with as little damage to the thread as possible. The tension of the thread can also be altered by various tensioning devices arranged along the thread path or within the thread source. These tensioning devices ensure that only a desired amount of thread is dispensed and that the thread forming stitches in the workpiece is appropriately tightened. Loose threads can allow stitches to come undone and tight threads can cause stitches to be formed incorrectly. The thread tension on the upper and lower threads can also be adjusted to ensure that tension forces are balanced from above and below so that stitches are properly formed along the desired sewing path in the workpiece. It is appreciated that the above described features and functions of an exemplary sewing machine may be operably connected to one or more sensors (e.g., sensors 110) to generate sensor feedback. For example, thread tension may be recorded by a tension sensor. If a thread is too loose or too tight, the tension sensor may generate sensor feedback indicating that that the thread tension is outside of an acceptable threshold.

Sewing machine 102 may further comprise at least one camera 104, a projector 106, display 108 and/or sensors 110. Such features as previously mentioned may be provided on a device separate from the sewing machine 102 and be applicable for use on the sewing machine. For example, projectors, displays, and other user interfaces such as speech recognition and its hardware components may be included on the sewing machine or else a separate user device, for example, a smartphone, tablet, goggles or glasses. Hardware may include microphones, speakers, piezoelectric haptic sensors, or similar. In certain embodiments, mirrors may be used to reflect and direct projected images onto a workpiece. Camera 104 may be configured to capture image data related to a workpiece and/or the sewing machine itself. In certain embodiments the camera 104 may be used in conjunction with sensors 110 to generate status information for the sewing machine 102 or a workpiece. In certain other embodiments, camera 104 may capture a plurality of images, for example, of the workpiece, of one or more components of the sewing machine 102, and/or the user. In certain embodiments, projector 106 may be used to project guidance images on a workpiece. In certain other embodiments, projector 106 may be used to project a guidance image on certain portions of the sewing machine 102 and/or in the immediate vicinity of thereof (e.g., on the workpiece) in order to facilitate the completion of a maintenance and/or media threading related activity. It is appreciated that sewing machine 102 may further comprise one or more processors and a memory to facilitate communication between its described components, the user device 112, and the user. More specifically, sewing machine 102 has at least a processor and a memory storing instructions, that when executed by the processor cause the processor to perform the functions outlined by the instructions (e.g., control various aspects of sewing machine 102, as described in detail herein). Processing may also occur separately or in combination with processors separate from the sewing machine, on a smartphone or via cloud computing, for example.

In some embodiments, display 108 associated with sewing machine 102 is configured to utilize an exemplary user interface which can be presented graphically to the user via one or more displays (e.g., display 108), including a touchscreen display that includes a touch sensitive overlay to detect the location of the fingers of the user that are touching the display. Thus, the user can interact with the user interface by directly touching the screen in particular locations and by performing touch gestures, such as the touch, touch and hold, pinch or spread, and touch and move gestures. The presence, position, and movement of the hands, fingers, or eyes or facial expression of the user can also be detected via analysis of data from an optical sensor (e.g., a camera 106) or a proximity sensor via disturbances of sound, light, infrared radiation, or electromagnetic fields. A graphical user interface can also be projected by one or more projectors (e.g., projector 104) of the sewing machine onto the sewing bed, a workpiece, an adjacent surface such as a wall or a table, or any other suitable surface. Alternatively, the sewing machine can be operated without a graphical user interface via voice commands and audible feedback in the form of certain sounds and/or a computerized voice. Tactile feedback can also be provided via actuators that cause various portions of the machine to vibrate when acted upon, otherwise via opto-haptic substitution principles where a digital micro-mirror device projector, emitting time-modulated spatial light, coupled with a finger or tool mounted phototransistor and actuator, creates special tactile feedback, in response to a wide variety of conditions of the workpiece, machine, or the like. Audible and tactile interaction with the sewing machine is particularly useful to users whose vision is impaired.

In exemplary embodiments, sewing machine 102 comprises one or more sensors 110. The sensors can measure various aspects related to the sewing machine 102, user device 112, and/or the user, including but not limited to, optical, tension, pressure, auditory, haptic, acoustic, sound, vibration, chemical, biometric, sweat, breath, fatigue detection, gas, smoke, retina, fingerprint, fluid velocity, velocity, temperature, light infrared, ambient light, color, RGB color (or another color space sensor, such as those using CMYK or greyscale color space), touch, tilt, motion, metal detection, magnetic field, humidity, moisture, imagine, photon, force density, proximity, ultrasonic, load cell, digital accelerometer, motion, translation, friction, compressibility, voice, microphone, voltage, barometer, gyroscope, hall-effect, magnetometer, voltage, barometer, GPS, electrical resistance, tension, strain, and many others.

It is appreciated that, in certain embodiments, sensors 110 may provide real time or near real time feedback to a user and/or user device, for example, with haptic sensor/feedback, an incorrect movement according to the desired activity could trigger a haptic response at sewing machine 102 such that the user would be instantly aware that they have incorrectly performed the activity. This instant feedback may include feedback via projected images and/or in conjunction with vibrations and sounds that indicate a negative confirmation. Positive reinforcement scenarios may also be applied in a similar manner. In some embodiments, sensor feedback may trigger a response at one or more user devices. For example, while performing a sewing activity using a pattern, a misalignment of the pattern and the workpiece could trigger a sensor feedback response at a smart watch associated with the user. This instant feedback could alert the user before to misalignment results in undesired output. In an example, a vibrating haptic feedback is emitted to a user's fingers while the user's fingers are placed on the fabric or workpiece to be sewn and thereby cuing the user as to the precise moment as to when the user must move the fabric to achieve the desired sewing result. These instructions could be accompanied with, or in place for audial instructions and projected instructional arrows onto the fabric.

User device 112 may be a handheld computing device such as a smartphone, tablet computer, or the like. User device 112 comprises at least a display 114 and a camera 116. It is appreciated that additional user devices with similar components are contemplated for use with the described systems and methods, including without limitation, smart glasses, Heads-up-displays (HUDs), smart watches, etc. In certain embodiments, it is appreciated that user device 112 may combine aspects of multiple devices, for example, a smartphone and a smart watch. It is appreciated that user device 112 may be configured to give feedback to a user of the user device 112 based on their interaction with sewing machine 102 and/or sensor feedback from the same. Camera 116 is configured to capture image data related to sewing machine 102 and the surrounding environment. As used herein, such data may be referred to as reference image data. The reference image data is a real-time or near real-time capture of the sewing machine 102 and its surrounding environment, including, for example, a workpiece. It is appreciated that image data comprises an image or series of images captured by camera 116 according to a frame rate associate with camera 116. The reference image data is displayed to a user via display 112. According to numerous embodiments disclosed herein, the reference image can be used in conjunction with a guidance image to facilitate interactive sewing machine guidance. In some embodiments, user device 112 may be mounted on or otherwise operably connected to sewing machine 102. This configuration can be useful when a user needs both hands to perform an activity.

Figure 2:
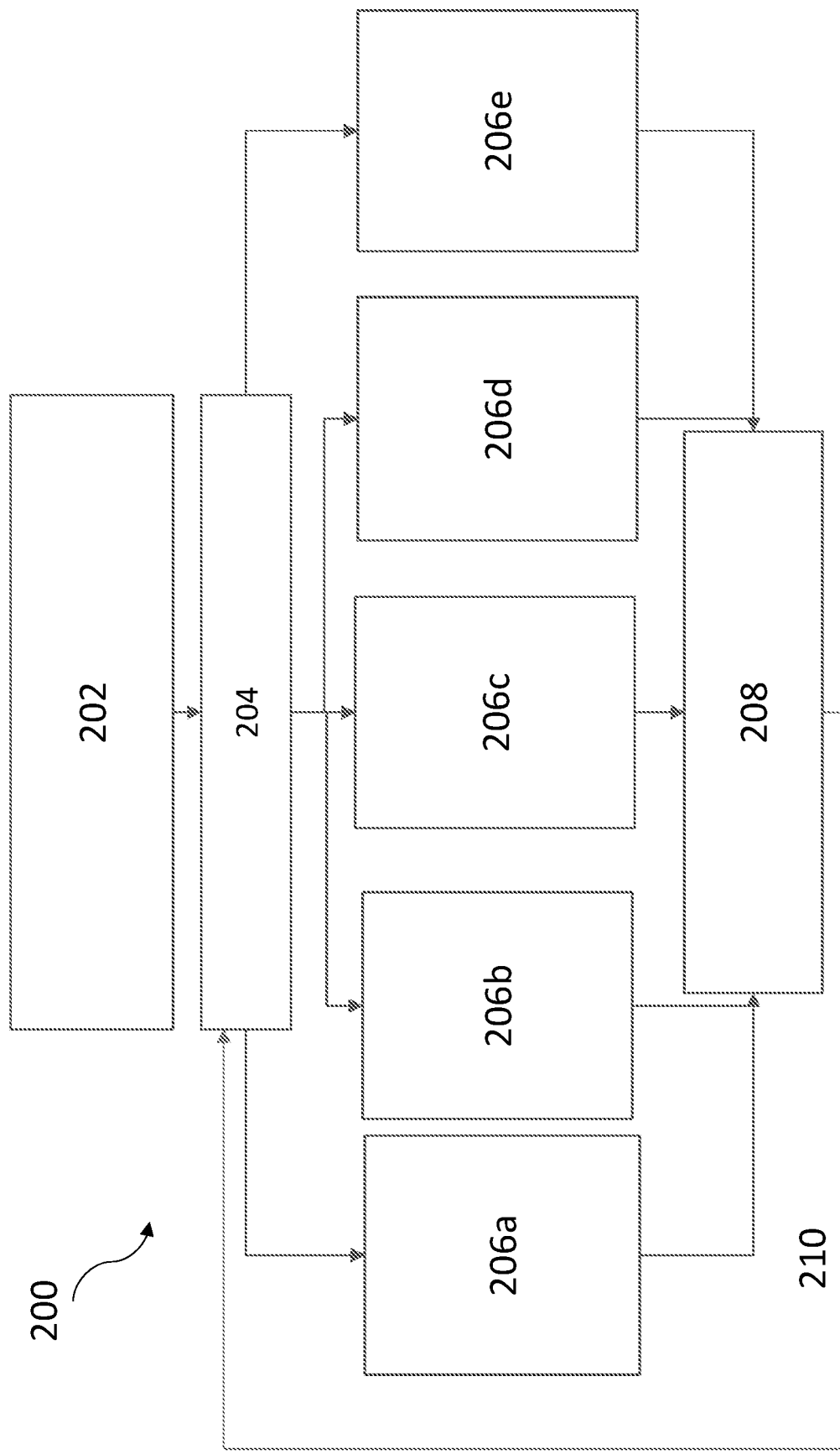
FIG. 2 shows an exemplary flow chart related to sensor feedback related to a sewing activity.

FIG. 2 shows a method 200 for exemplary interactive sewing machine guidance according to the present disclosure. The method begins at step 202 where a user requests information about an activity related a sewing machine (e.g., sewing machine 102). An activity may be an action for locating a feature or performing an operation on the sewing machine. Exemplary activities are described in more detail below. In some embodiments, the interactive guidance methodologies as described herein facilitate guidance of an activity through a display of digital image overlay on a reference image of a sewing machine e.g., the exterior and/or interior components. For example, a user device may generate and display a digital image (and/or a series of images/video) that may animate movement of certain components of the sewing machine in order to perform an activity. The image is then overlaid on a reference image of an actual sewing machine. In certain embodiments, this reference image is captured by a camera associated with the user device. An exemplary activity that may take advantage of the image overlay interactive guidance is a threading activity, for example, threading sewing machine or serger.

More exemplary activities taking advantage of the image overlay interactive guidance are activities related to the location and identification of sewing machine components and/or accessories. As a further example, image overlay can be used to demonstrate the location and name of critical parts of the sewing machine, the location and functionality of user interfaces associated with the sewing machine, and the location and functionality all other components of the sewing machine. Image overlay may also be used to identify an unknown component or accessory. For example, using the reference image, user device 112 may recognize the component or accessory based on its size, shape, or location on the sewing machine. In another example, image overlay can provide interactive guidance of changing an accessory, for example but not limited to a needle, presser foot, stitch plate, or bobbin. Image overlay may also be used for interactive guidance of using and fixating large accessories. For example, securing fabric in an embroidery hoop, fixating an embroidery hoop onto a sewing machine. Image overlay may further assist in interactive guidance of certain maintenance tasks such as cleaning or lubrication of certain parts (simple) or repair of certain components (complex).

In some embodiments, the interactive guidance methodologies as described herein facilitate guidance of an activity through projecting an image onto the sewing bed. Such activities may be difficult to use with a user device (such as activities that require both hands) or those activities which require special attention to the workpiece on the sewing bed area. One or more short thrown projectors (e.g., projector 104) can create 2D or 3D projections at the sewing bed in order to guide performance of an activity. In some embodiments mid-air visual projections may be created via projection or hologram techniques. In certain embodiments, an additional accessory such as smart glasses may be used to interpret visual projections. Projection onto the sewing bed can facilitate viewing and selecting different stitch and embroidery options on a fabric, different embellishment options for the fabric, or available sewing techniques suitable for the fabric. Projection may also be used to perform complicated stich or embroidery activities, such as understanding when and how to rotate and/or translate fabric, when and how to add textile embellishment, and when and how to use a special sewing accessory. Further still, projection may assist in performance of basis operations in the sewing area, such as for example, when and how to change a needle, how to thread one or more needles, how to attach an accessory, when and how to change the presser foot, and when and how to lift the presser foot.

It is appreciated that the exemplary activities as described above are for example only and it is further appreciated that each activity may be adapted for use with image overlay and/or image projection within the scope of the present disclosure.

With reference to FIG. 2, in some embodiments, a method 200 for interactive sewing machine guidance may begin at step 202 when an activity is automatically recognized by the sewing machine 102 (e.g., via AI, neural network, and/or algorithms coupled with sensor data input triggers) or user device 112 (e.g., via mapping, tracking, and recognition algorithms coupled with optical sensor data) or else specifically requested by the user. In certain embodiments, an activity may be recognized automatically by the sewing machine 102 and/or user device 112 based on operational feedback of the sewing machine (e.g., activation of the pedal, engagement with the threading components, etc.), or recognized based on observed optical data from camera 104 associated with sewing machine 102 and/or camera 116 associated with user device 112.

After an activity is selected, interactive guidance can be provided using, for example Augmented Reality (AR). As used herein, AR encompasses a virtual image overlay for purposes of guiding a user to complete an activity. In certain embodiments, AR image overlays may be accomplished by displaying a guidance image over a reference image at a display (e.g., display 114 and/or display 108). For example, user device 112 may be displaying an image of sewing machine 102 with a guidance image overlaid. In certain other embodiments, a guidance image may be physically projected on a surface such as the sewing bed, for example, by projector 104. The guidance image can inform the user how to perform certain tasks related to their chosen activity. Various types of image overlay are contemplated herein and illustrated by steps 206a-e. At step 206a, "markerless AR" comprises a virtual image overlaid onto the reference image. The overlaid image can be either fully or partially augmented, meaning, for example, in certain embodiments the overlaid image may recreate aspects of the reference image rather than displaying the reference image itself. For example, in some embodiments, rather than overlay an arrow pointing to a bobbin that is to be replaced (e.g., partial overlay), the overlaid guidance image may generate a digital version of the bobbin and animate the bobbin in order to demonstrate the portion of the activity that was previously accomplished by the arrow. Another example may be a digital version of a button or decoration to be sewn onto a fabric in order to aid the user in placing the object and demonstrating how the stitching procedure should occur. Yet another example would be a digital version of fingers holding a thread and demonstrating how one should position the thread in the various paths on a serger. This facilitates an interactive experience, where the user's own hands attempt to follow the guidance of the virtual hands and thread in order to achieve correct threading of the machine. In a similar manner other activities facilitate an interactive experience. It is further appreciated that while the guidance image is being displayed it may be modified based on feedback from the sewing machine 102 and/or user device 112. In embodiments where the user device provides feedback, such feedback data may comprise additional camera data, accelerometer data, digital compass data, GPS aid calculations, etc. For example, feedback vectors could modify the guidance image in case the user chooses to rotate or translate a 3D overlaid image of an applique over a sewing workpiece and chooses an unfeasible position for sewing the application on the workpiece, the guidance image could be modified in such a way that it would guide the user to an acceptable positioning of the applique for sewing onto the workpiece.

At step 206b, "location-based AR" can be selected. "Location-based AR" comprises a guidance image fully or partially overlaid onto the reference image. In some embodiments "location-based AR" can utilize GPS, digital compass, velocity meter, or accelerometer data from the user device 112 to calculate precise location and aid in image overlay.

At step 206c, "simultaneous localization and mapping (SLAM)" can be selected, which comprises overlaying a guidance image over a reference image and modifying the guidance image based on a set of algorithms configured to solve simultaneous localization and mapping tasks via localizing sensors with respect to the surroundings. For example, a user could rotate fabric of a workpiece during sewing and simultaneous localization and mapping of the reference image could identify and follow the fabric's pattern or topography and for each newly occurring stitch onto the fabric, ensuring that any relevant overlaid guidance image would correctly follow the fabric as translation occurs.

In certain embodiments, sewing machine 102 may have one or more identifying characteristics that allow user device 112 and camera 116 to calibrate position of the user device such that an improved guidance image can be produced by the user device. Such characteristics can be employed at step 206d, where "recognition-based AR" can be selected. With "recognition-based AR" image data from camera 106 and/or camera 116 may be used to identify visual markers, such as, for example, unique features, QR/2D codes, natural feature tracking (NFT) markers, object, orientation, etc., and use the visual markers to influence the guidance image.

At step 206e, "projection based AR" can be selected, which comprises an image projected onto a surface and/or the environment surround the sewing machine 102. With this type of image guidance, a visual mapping comprising 2D and/or 3D static and/or dynamic/animated images can be projected with light (e.g., using projector 104) on the sewing bed area or other relevant area with figures and shapes that instruct or guide a user in performing an activity. In certain embodiments, the projected light can come from user device 112 or another outside source. In some embodiments, "projection based AR" can be used to outline along a workpiece to guide a user to sew along lines, thread a serger, or other activities.

It is appreciated that the types of image overlay discussed with reference to steps 206a-f are offered for exemplary purposes only and additional types of image overlay may be apparent from the detailed description herein. Additionally, it is contemplated that the types of exemplary image overlay may be combined together during exemplary interactive sewing machine guidance.

At step 208 feedback is collected and can influence the guidance image generated using one or more of the above exemplary guidance image types. In certain embodiments, the type of guidance image used may change based on the feedback. As feedback is considered, the method 200 returns to step 204 using feedback loop 210. The feedback loop 210 may be utilized an unlimited number of times or until the activity is completed. By continually collecting feedback and modifying the guidance image according to the feedback, a user is able to diagnose and correct potential issues with their activity, for example, if they have incorrectly threaded a serger. With existing mechanisms, if a user has incorrectly threaded the sewing machine, the problem might not be realized until a sewing related activity has commenced therefore breaking the thread, creating a jam in the sewing machine, and making correct sewing impossible until the time consuming task of removing damaged thread and rethreading is completed correctly. Furthermore, it is appreciated that it is an aspect of the presently described methods and system that the enhanced guidance image can serve to notify a user that, according to the feedback, the activity has not been performed correctly.

Figure 3:
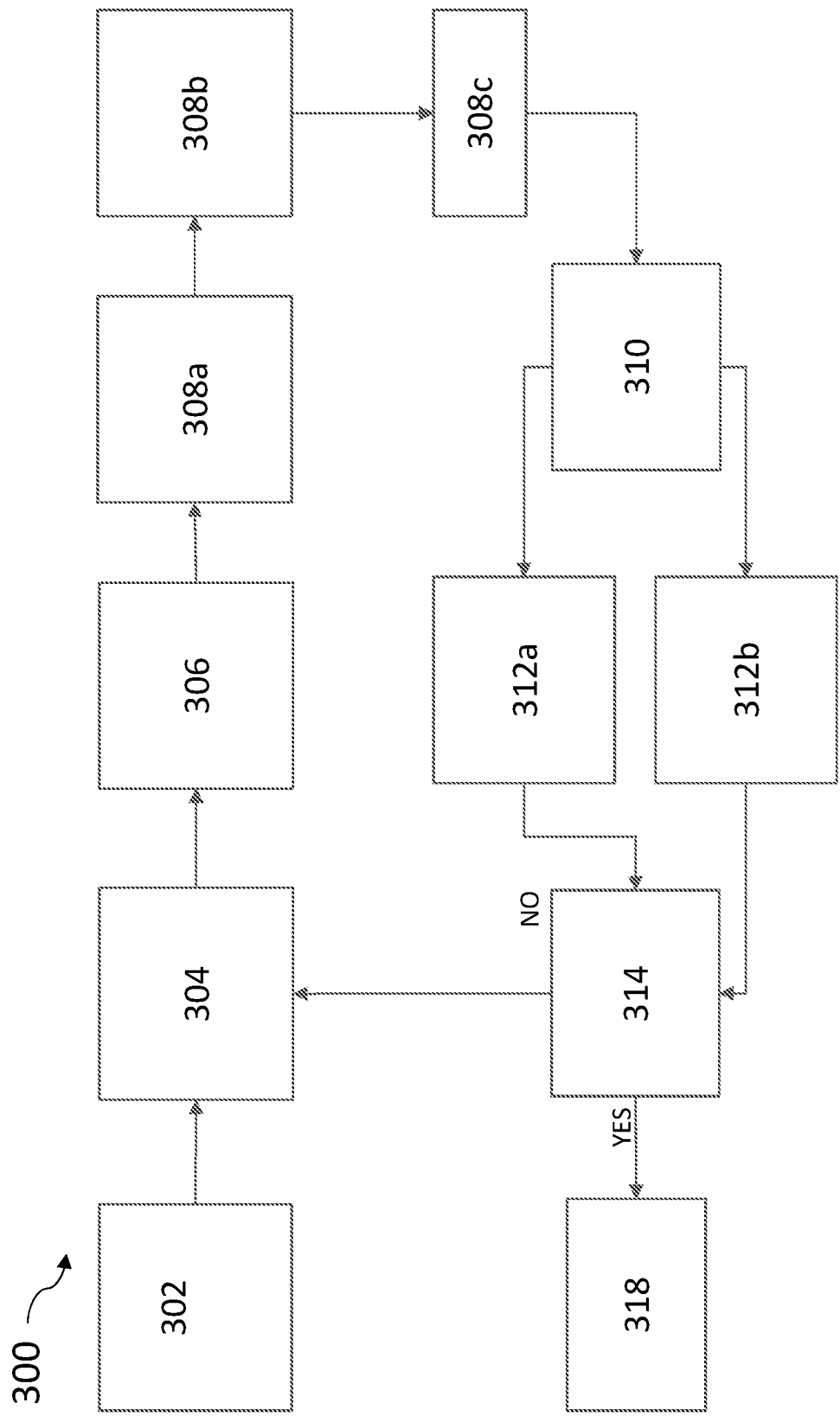
FIG. 3 shows an exemplary flow chart related to sensor feedback related to a sewing activity.

FIG. 3 shows an exemplary method 300 related to sensor feedback related to a sewing activity. At step 302 a user selects an activity. At step 304 a connected device or sewing machine presents an AR guidance image overlaid on a reference image of the sewing machine or relevant surroundings. At step 306 the user follows the guidance provided by the guidance image to proceed with performance of the desired activity. At step 308a, data collection related to performance of the activity (e.g., image data collected by camera 116) is collected at the user device. At step 308b, data collection related to performance of the activity (e.g., data collected from sensors 110, such as optical, tension, and pressure sensors) is collected at the sewing machine. At step 308c, data collection related to performance of the activity is collected at the user device and the sewing machine. At step 310 local or external data processing is performed. In certain embodiments, data processing may be performed at the user device 112, sewing machine 102, and/or at an external source (e.g., the cloud). At step 312a data (e.g., optical, tension, and/or pressure data) is analyzed to confirm if measurable data attributes constitute acceptable values. The analysis may occur via simple input image to reference image comparison and may be in combination with object detection and tracking sensors (i.e. optical sensors, capacitive sensors, photoelectric sensors, laser, proximity sensors, infrared, optical time of flight sensors, mechanical sensors, etc.). Alternatively the analysis may be performed via more sophisticated artificial intelligence methods in which data is processed via a neural network or networks and multi-sensor data input. For instance: data is received, analyzed in neural network layers and a prediction of recognition of correct or incorrect objects, their position, and movement, may be analyzed in a pre-trained or training network designed to recognize situations and user actions. Then a then a response may be triggered based on the forementioned steps. Accurate predictions may be based on a scoring system. For example, accuracy predictions, of correct or incorrect user actions, which are greater than a certain percentage or a threshold value, may be considered acceptable; based on the eventual forms of collected in-data. At step 312b the data enters input layers in neural network and output layer gives an assessment of the completeness of an activity. It is appreciated that all forms of data available to the sewing machine, that is, from the sensors, software, data storage devices, user input via software, and the like can be processed through a neural network. Exemplary neural networks for use with the interactive sewing machine guidance technologies as described herein are described in more detail in U.S. patent application Ser. No. 17/352,035 entitled SEWING MACHINE AND METHODS OF USING THE SAME, the subject matter of which is incorporated herein by reference, in its entirety. The information to be processed first encounters the input layers of the neural network which perform an initial processing of the input data and output the results to one or more hidden layers to process the output values from the input layers. Information that has been processed through the hidden layers is presented at the output layer as a probability of confidence in a given result, such as, for example, the location of a detected object in an image and the classification of that object. The software in the computer of the sewing machine receives the information from one of the layers of the neural network and can take action accordingly to adjust the parameters of the sewing machine and/or to inform the user based on the results of the neural network processing.

During training of the neural network, the node parameters (i.e., at least one of the input parameters, function parameters, and output parameters) for each node in the neural network are adjusted via a backpropagation algorithm until the output of the neural network corresponds to a desired output for a set of input data. During exemplary neural network processing, the neural network begins the training process with node parameters that can be randomized or can be transferred from an existing neural network. The neural network is then presented with data from the sensors to process. For example, an object can be presented to the optical sensor to provide the neural network with visual data. The data is processed by the neural network and the output is tested so that the node parameters of the various nodes of the neural network can be updated to increase the probability of confidence in the detection and classification performed by the neural network. For example, when a presser foot is shown to the optical sensor for identification by the neural network, the neural network will present a probability of confidence that the object being shown to the optical sensor is located in a range of coordinates of the image and can be classified as a particular presser foot. As the training process is carried out, the node parameters of the nodes of the neural network are adjusted so that the neural network becomes more confident that a particular answer is correct. Thus, the neural network comes to "understand" that when presented with certain visual data, a particular answer is the most correct answer, even if the data is not exactly the same as what has been "seen" before.

A neural network is considered "trained" when the decisions made by the network reach a desired level of accuracy. The trained neural network can be characterized by the collection of node parameters that have been adjusted during the training process. The collection of node parameters can be transmitted to other neural networks having the same node structure so that those other neural networks process data in the same manner as the initially trained network. Thus, a neural network stored in a data storage device of a particular sewing machine can be updated by downloading new node parameters. It should be noted that the node parameters of a neural network—such as input weight parameters and threshold values—tend to take up significantly less storage space than image libraries used for comparisons with image or visual data gathered by optical sensors. Consequently, neural networks files and other critical files can be updated via the network quickly and efficiently. For example, the structure of the neural network— i.e., the map of connections between nodes and the activation function calculated in each node—can also be updated in this way.

A neural network can also be trained continuously such that the node parameters are updated periodically based on feedback provided from various data sources. For example, node parameters of a neural network stored locally or externally can be updated periodically based on data gathered from sensors that agree or disagree with the output of the neural network. These adjusted node parameters can also be uploaded to a cloud-based system and shared with other sewing machines so that the neural networks of all of the sewing machines improve over time.

In certain embodiments, data collected by the sensors of a sewing machine can be processed locally on the sewing machine or via external processors in a cloud-based neural network. The locally stored neural network can be pre-trained or can be a continuously updating neural network. The data processed by the neural network—locally or remotely— is then used by the software of the sewing machine to make a decision that results in machine and/or user interaction.

It is appreciated that various types of feedback mechanisms are contemplated herein. It is appreciated that feedback may trigger a feedback response at the user device and/or sewing machine. For example, feedback response may be relayed to the user through visual, audible, and tactile means. For example, an indication that an incorrect accessory has been installed on the machine can be presented to the user via the user interface on the display of the sewing machine while a notification sound—e.g., a beep or a computerized voice— is transmitted to the user via speakers in the sewing machine and/or the user device. The notification can also be transmitted to the user via haptic or tactile feedback through vibration of portions of the machine being touched by the user. That is, the sewing bed can be vibrated by the sewing machine to provide a warning to the user that the machine is not properly configured for the particular sewing operation selected by the user. The user would feel the vibrations below their fingers that are in contact with the workpiece and sewing bed, thereby prompting the user to look at the display for further information. The illuminating lights of the sewing machine can also be controlled to alert the user, such as by illuminating certain regions on the machine to gain the user's attention, changing the color or flashing when an incorrect accessory is installed so that the user is prompted to look at the display for additional information. It is appreciated that the neural networks as described above are readily adaptable to make predictive assessments of the completeness and/or accuracy of a given activity based on the sensor data. It is further appreciated that the exemplary neural network can be used throughout the methods and system as described herein to analyze, interpret, and utilize feedback data (e.g., from sewing machine 102, user device 112, and/or external sources).

Returning to FIG. 3, at step 314 it is determined if the activity is complete (e.g., using the metrics provided by step 312a and/or 312b). If the activity is determined to not be complete, the method 300 returns to 304 to repeat all or a portion of the activity until the activity is determined to be compete at step 314. Once the activity is determined to be compete, the method ends at step 318. In certain embodiments, certain verification procedures may be performed to assess the results of the activity and, in such embodiments, may require that the activity be repeated, or in the alternative, an additional activity be performed.

Figure 4:
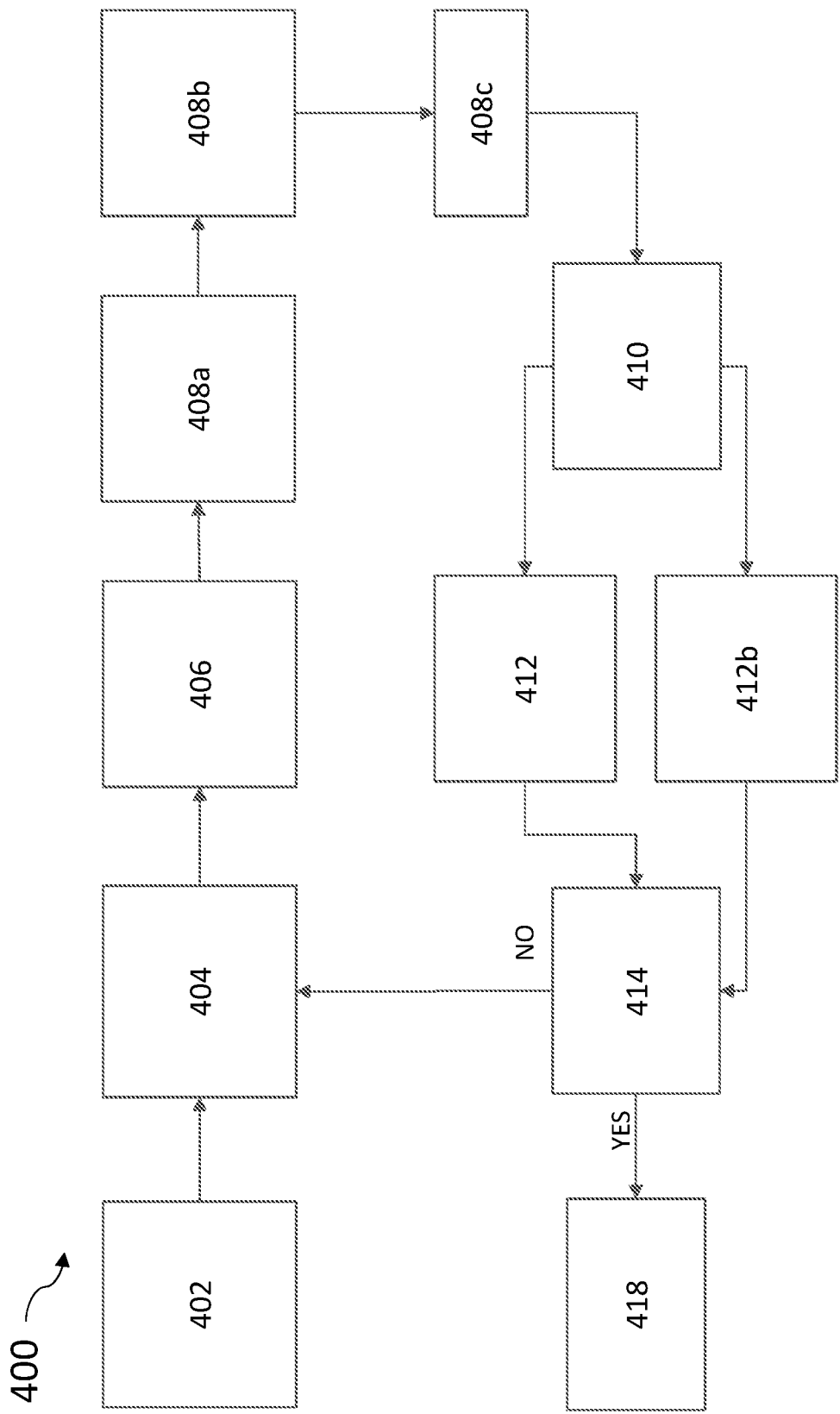
FIG. 4 shows a flow chart related to exemplary methods of performing a serger threading activity.

FIG. 4 shows an exemplary method 400 related to sensor feedback related to the sewing activity of threading a serger. At step 402 a user selects an activity related to threading a serger. At step 404 a connected device or sewing machine presents an AR guidance image overlaid on a reference image of the sewing machine or relevant surroundings instructing the user how to thread a serger. At step 406 the user follows the guidance provided by the guidance image to proceed with performance of the desired activity. At step 408a, data collection related to performance of the activity (e.g., image data collected by camera 116) is collected at the user device. At step 408b, data collection related to performance of the activity (e.g., data collected from sensors 110, such as optical, tension, and eventual pressure sensors) is collected at the sewing machine. At step 408c, data collection related to performance of the activity is collected at the user device and the sewing machine. At step 410 local or external data processing is performed. In certain embodiments, data processing may be performed at the user device 412, sewing machine 102, and/or at an external source (e.g., the cloud). At step 412a data is analyzed to confirm if measurable data attributes (e.g., optical, tension, and/or pressure values) constitute acceptable values. At step 412b data enters input layers in a neural network and output layers give a predictive assessment of the accuracy of completeness of an activity.

At step 414 it is determined if the serger threading activity is complete (e.g., using the metrics provided by step 412a and/or 412b). If the activity is determined to not be complete, the method 400 returns to 404 to repeat all or a portion of the activity until the activity is determined to be complete at step 414. Once the activity is determined to be complete, the method ends at step 418. In certain embodiments, certain verification procedures may be performed to assess the results of the activity and, in such embodiments, may require that the activity be repeated, or in the alternative, an additional activity be performed. For example, in a serger threading activity, multiple threads and thread paths exist on the serger requiring a sequenced verification of the proper thread and path, which could be performed after the activity has been completed.

Figure 5:
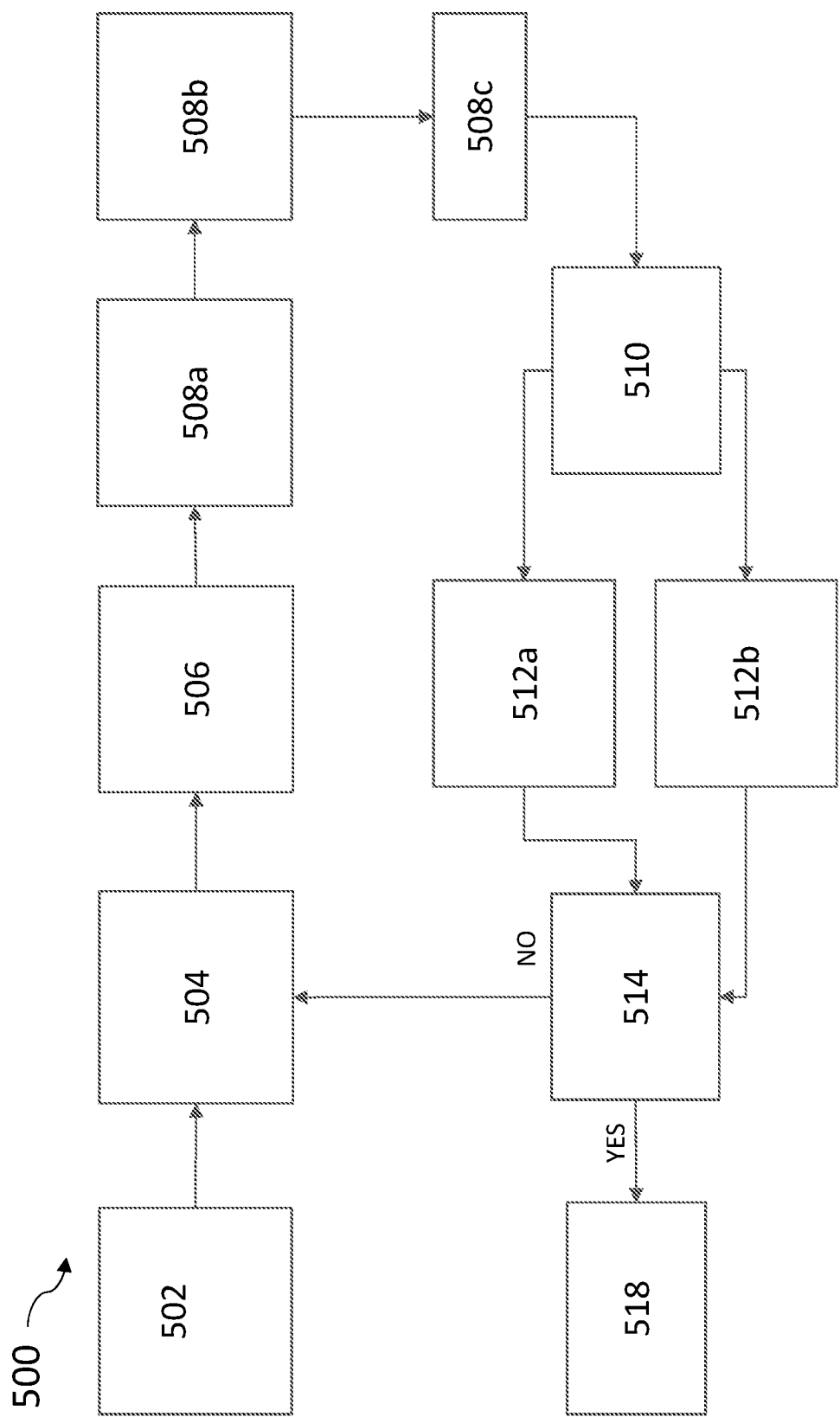
FIG. 5 shows a flow chart related to exemplary methods of performing a bobbin change activity.

FIG. 5 shows an exemplary method 500 related to sensor feedback related to a sewing activity related to changing a bobbin. At step 502 a user selects an activity related to changing a bobbin. At step 504 a connected device or sewing machine presents an AR guidance image overlaid on a reference image of the sewing machine or relevant surroundings. At step 506 the user follows the guidance provided by the guidance image to proceed with performance of the desired activity. At step 508a, data collection related to performance of the activity (e.g., image data collected by camera 116) is collected at the user device. At step 508b, data collection related to performance of the activity (e.g., data collected from sensors 110, such as optical, tension, and eventual pressure sensors) is collected at the sewing machine. At step 508c, data collection related to performance of the activity is collected at the user device and the sewing machine. At step 510 local or external data processing is performed. In certain embodiments, data processing may be performed at the user device 112, sewing machine 102, and/or at an external source (e.g., the cloud). At step 512a data (e.g., optical, tension, and/or pressure values) is analyzed to confirm if measurable data attributes constitute acceptable values. At step 512b data enters input layers in neural network and output layer gives an assessment of the completeness of an activity. At step 514 it is determined if the activity is complete (e.g., using the metrics provided by step 512a and/or 512b). If the activity is determined to not be complete, the method 500 returns to 504 to repeat all or a portion of the activity until the activity is determined to be compete at step 514. Once the activity is determined to be compete, the method ends at step 518. In certain embodiments, certain verification procedures may be performed to assess the results of the activity and, in such embodiments, may require that the activity be repeated, or in the alternative, an additional activity be performed. For example, in the above exemplary activity, the user would need to ensure that the thread from the bobbin unrolls in the correct direction otherwise the needle may break or thread tension will be incorrect.

Figure 6:
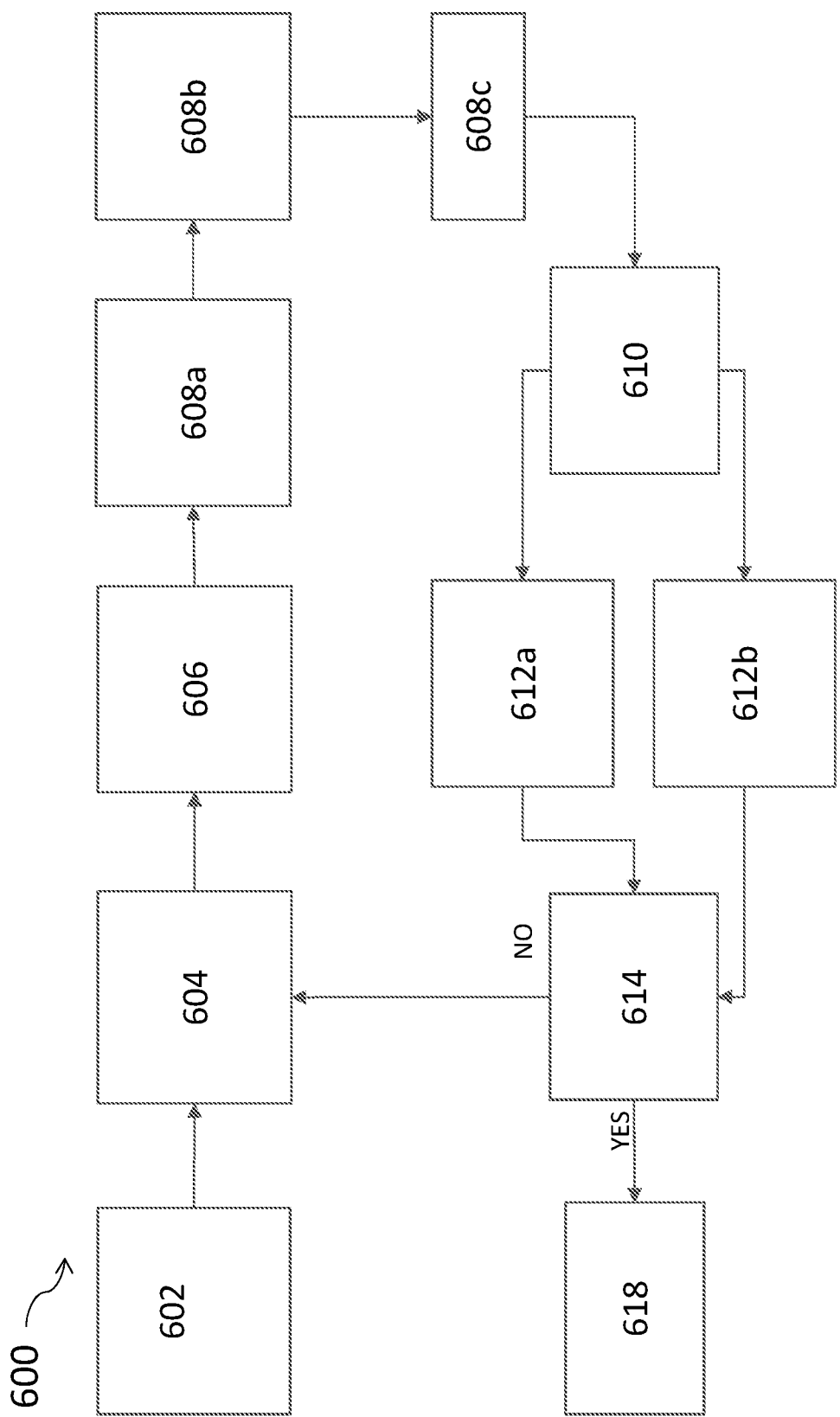
FIG. 6 shows a flow chart related to exemplary methods of performing an embroidering hoop loading activity.

FIG. 6 shows an exemplary method 600 related to sensor feedback related to a sewing activity of how to load and connect an embroidery hoop. At step 602 a user selects the activity of loading and connecting an embroidery hoop. At step 604 a connected device or sewing machine presents an AR guidance image overlaid on a reference image of the sewing machine or relevant surroundings. At step 606 the user follows the guidance provided by the guidance image to proceed with performance of the desired activity. At step 608a, data collection related to performance of the activity (e.g., image data collected by camera 116) is collected at the user device. At step 608b, data collection related to performance of the activity (e.g., data collected from sensors 110, such as optical, tension, and eventual pressure sensors) is collected at the sewing machine. At step 608c, data collection related to performance of the activity is collected at the user device and the sewing machine. At step 610 local or external data processing is performed. In certain embodiments, data processing may be performed at the user device 112, sewing machine 102, and/or at an external source (e.g., the cloud). At step 612a data is run through an algorithm to confirm if measurable data attributes constitute acceptable values. For example, optical, tension, and/or pressure values. At step 612b data enters input layers in neural network and output layer gives an assessment of the completeness of an activity. At step 614 it is determined if the activity is complete (e.g., using the metrics provided by step 612a and/or 612b). If the activity is determined to not be complete, the method 600 returns to 604 to repeat all or a portion of the activity until the activity is determined to be compete at step 614. Once the activity is determined to be compete, the method ends at step 618. In certain embodiments, certain verification procedures may be performed to assess the results of the activity and, in such embodiments, may require that the activity be repeated, or in the alternative, an additional activity be performed.

Figure 7:
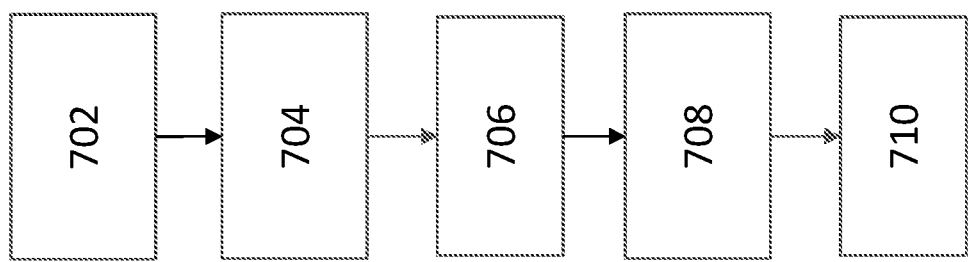
FIG. 7 shows a flow chart illustrating an exemplary method for sewing machine guidance.

FIG. 7 illustrates a flow chart of an exemplary method for interactive sewing machine guidance. It will be appreciated that the illustrated method and associated steps may be performed in a different order, with illustrated steps omitted, with additional steps added, or with a combination of reordered, combined, omitted, or additional steps.

The method begins at step 702 where a reference image is received. A guidance image is overlaid over the reference image at step 704. At step 706 an activity is initiated. As described herein, the activity may be any activity associated with operation and/or maintenance of a sewing machine. At step 708 activity feedback is analyzed, for example, by the user device 112. It is appreciated that in certain embodiments, activity feedback may also be analyzed by the sewing machine 102, an external source, and/or some combination of the user device 112, the sewing machine 102, and the external source. At step 710 the guidance image is modified based on the activity feedback. It is appreciated that the modification to the guidance image may be directed to facilitating the completion of the activity. For example, an exemplary modification may be alerting a user that they have incorrectly threaded the sewing machine.

Figure 8:
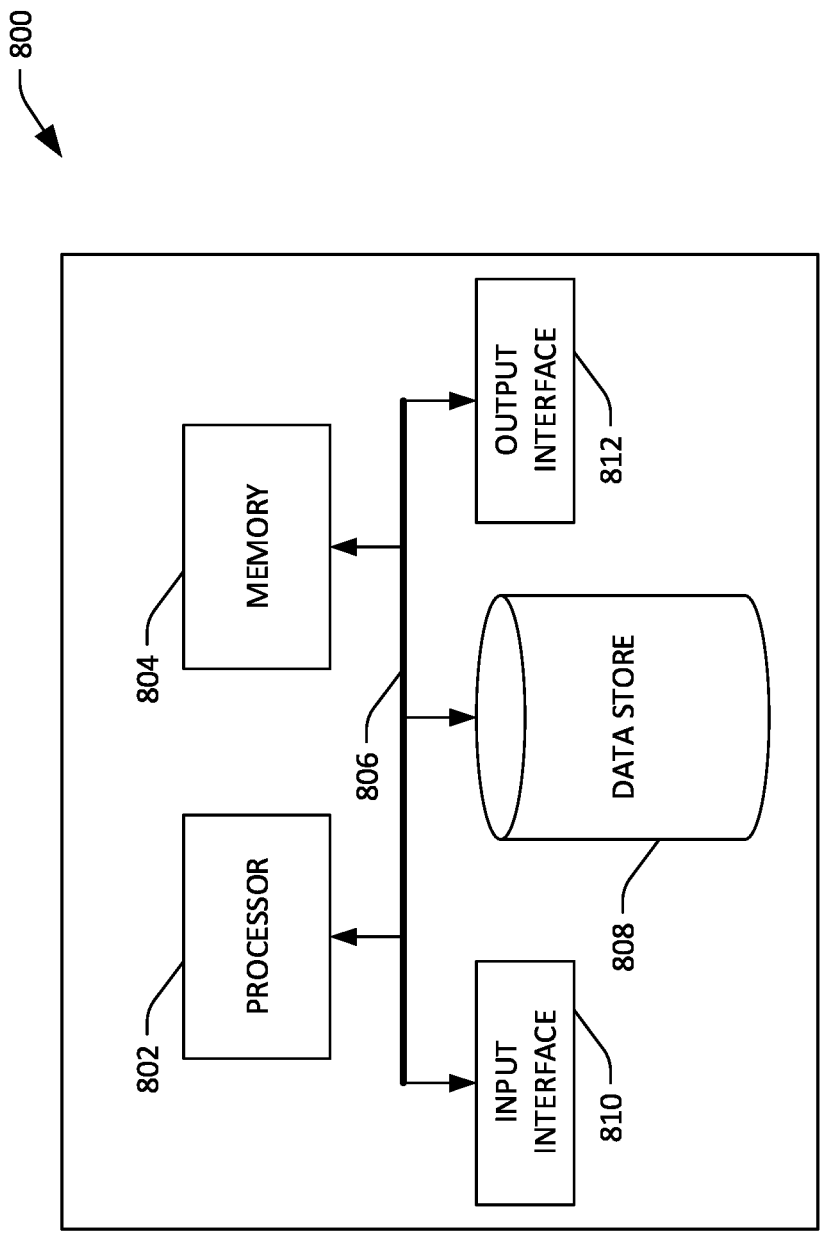
FIG. 8 shows an exemplary computing device.

Referring now to FIG. 8, a high-level illustration of an example computing device 800 that can be used in accordance with the systems and methodologies disclosed herein is illustrated. It is appreciated that user device 112 is one exemplary implementation of computing device 800. It is further appreciated that sewing machine 102 may further comprise elements of computing device 800. The computing device 800 may be used in a system for interactive sewing machine guidance (e.g., system 100). The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806.

The computing device 800 additionally comprises a data store 808 that is accessible by the processor 802 by way of the system bus 806. The data store 808 may include executable instructions related executing the systems and methods disclosed herein. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

It is to be understood that the exemplary systems described herein (e.g., sewing machine 102, user device 112, etc.) herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

The invention claimed is:

1. A method for interactive sewing machine guidance, the method comprising:
   receiving image data from a camera of a user device, wherein the image data comprises a reference image of at least a portion of a sewing machine;
   displaying the reference image at the user device, wherein the user device comprises a display;
   overlaying a guidance image over the reference image at the user device, wherein the guidance image illustrates at least one step of an activity associated with the sewing machine;
   responsive to an indication that the activity has been started, receiving sensor feedback from at least one sensor at the sewing machine, wherein the sensor feedback is generated based on performance of the activity; and
   responsive to the sensor feedback, modifying the guidance image at the user device.

2. The method of claim 1, wherein the sensor feedback indicates that the user has completed the at least one step of the activity.

3. The method of claim 2, wherein modifying the guidance image comprises illustrating a second step of the activity.

4. The method of claim 3, wherein modifying the guidance image is repeated until the activity is completed.

5. The method of claim 4, wherein completion of the activity is based on a comparison of the guidance image and the reference image.

6. The method of claim 1, wherein the sensor feedback indicates that at least one step of the activity has been performed incorrectly.

7. The method of claim 6, wherein the sensor feedback is haptic feedback operable to vibrate at the user device.

8. The method of claim 1, wherein the activity comprises threading a sewing machine.

9. The method of claim 1, wherein the activity comprises threading a serger.

10. The method of claim 1, wherein the activity comprises, sewing a workpiece.

11. A method for interactive sewing machine guidance, the method comprising:
    responsive to an activity request, initiating an activity at a sewing machine, wherein the activity comprises manipulating a workpiece with the sewing machine;
    receiving image data from a camera, wherein the image data comprises a reference image of the workpiece;
    projecting a guidance image onto the workpiece, wherein the guidance image is based on the reference image;
    receiving sensor feedback from at least one sensor at the sewing machine, wherein the sensor feedback is generated based a comparison of the guidance image and the reference image; and
    determining a completeness of the activity based on the sensor feedback.

12. The method of claim 11, further comprising detecting an error in the activity based on the sensor feedback.

13. The method of claim 11, wherein the activity additionally comprises threading a sewing machine.

14. The method of claim 11, wherein the activity additionally comprises threading a serger.

15. The method of claim 11, further comprising:
    modifying the guidance image based on the completements of the activity.

16. The method of claim 11, wherein projecting the guidance image onto the workpiece is performed by a user device.

17. The method of claim 11, wherein projecting the guidance image onto the workpiece is performed by the sewing machine.

18. A method for interactive sewing machine guidance, the method comprising:
    responsive to an activity request, initiating an activity at a sewing machine, wherein the activity comprises manipulating a workpiece with the sewing machine;
    receiving image data from a camera of a user device, wherein the image data comprises a reference image of at least a portion of the sewing machine;
    displaying a reference image at the user device, wherein the user device comprises a display;
    overlaying a first guidance image over the reference image at the user device, wherein the guidance image illustrates at least one step of an activity associated with the sewing machine;
    responsive to an indication that the activity has been started, receiving sensor feedback from at least one sensor at the sewing machine, wherein the sensor feedback is generated based on performance of the activity, wherein the sensor feedback is operable to generate physical feedback; and
    responsive to the sensor feedback, modifying the guidance image at the user device.

19. The method of claim 18, wherein the physical feedback is a vibration at the user device.

20. The method of claim 18, wherein the physical feedback is a vibration at the sewing machine.

* * * * *